(12) United States Patent
Steibel et al.

(10) Patent No.: US 6,670,026 B2
(45) Date of Patent: Dec. 30, 2003

(54) CERAMIC MATRIX COMPOSITE TURBINE COMPONENTS

(75) Inventors: James Dale Steibel, Hamilton, OH (US); Wayne Garcia Edmondson, Xenia, OH (US); Wilbur Douglas Scheidt, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/175,756

(22) Filed: Jun. 20, 2002

(65) Prior Publication Data

US 2002/0190039 A1 Dec. 19, 2002

Related U.S. Application Data

(62) Division of application No. 09/595,866, filed on Jun. 16, 2000, now Pat. No. 6,441,341.

(51) Int. Cl.[7] .............................................. B23K 26/18
(52) U.S. Cl. .................................................. 428/293.4
(58) Field of Search ....................... 219/121.61, 121.67, 219/121.62, 121.82, 121.69, 121.75, 121.68, 121.83, 121.71, 121.7, 121.85, 121.65, 121.66; 700/166; 29/889.721, 889.72, 889.71; 428/293.4; 264/125, 128, 332

(56) References Cited

U.S. PATENT DOCUMENTS

| | | | |
|---|---|---|---|
| 3,601,576 A | * | 8/1971 | Schlafli et al. ......... 219/121.71 |
| 4,220,842 A | * | 9/1980 | Sturmer et al. ........ 219/121.85 |
| 4,276,331 A | | 6/1981 | Bothwell |
| 4,642,271 A | | 2/1987 | Rice |
| 4,738,902 A | | 4/1988 | Prewo et al. |
| 4,762,464 A | | 8/1988 | Vertz et al. |
| 4,808,785 A | | 2/1989 | Vertz et al. |
| 4,837,230 A | | 6/1989 | Chen et al. |
| 4,873,414 A | | 10/1989 | Ma et al. |
| 5,049,722 A | * | 9/1991 | Corfe et al. ............ 219/121.71 |
| 5,140,127 A | | 8/1992 | Stroud et al. |
| 5,147,587 A | | 9/1992 | Marcus et al. |
| 5,222,617 A | | 6/1993 | Gregory et al. |
| 5,465,780 A | | 11/1995 | Muntner et al. |
| 5,683,600 A | | 11/1997 | Kelley et al. |
| 5,747,769 A | | 5/1998 | Rockstroh et al. |
| 5,773,790 A | | 6/1998 | Moore et al. |
| 5,837,964 A | | 11/1998 | Emer et al. |
| 5,853,653 A | | 12/1998 | Donato et al. |
| 5,879,803 A | | 3/1999 | Masaki et al. |
| 5,914,060 A | | 6/1999 | Flis et al. |
| 6,054,673 A | | 4/2000 | Chen |
| 6,339,208 B1 | | 1/2002 | Rockstroh et al. |

FOREIGN PATENT DOCUMENTS

| | | |
|---|---|---|
| EP | 488402 A2 | 6/1992 |
| EP | 770448 A1 | 5/1997 |
| EP | 826457 A1 | 3/1998 |

* cited by examiner

*Primary Examiner*—Tom Dunn
*Assistant Examiner*—Jonathan Johnson
(74) *Attorney, Agent, or Firm*—Carmen Santa Maria; Brian T. Sattizahn; McNees Wallace & Nurick LLC

(57) ABSTRACT

A method for producing apertures in hot section components of gas turbine engines made from ceramic matrix composites that have at least one oxidizable component. The method involves forming the apertures using a laser beam controlled by parameters that ablate the ceramic matrix composite in the path of the beam, while simultaneously heating the matrix material, SiC or SiN, to a sufficient temperature to oxidize it to form a silica. Sufficient heat is supplied by the beam to melt the silica to cause it to flow. The melted silica is quickly solidified as recast silica along the walls of the newly created aperture before it has an opportunity to flow and form undesirable geometries. The wall of the aperture is formed of recast silica that is a smooth surface and that forms an oxidation barrier to inhibit any further oxidation of the underlying composite as it is exposed to the high temperatures and oxidative, corrosive atmosphere of an operating gas turbine.

20 Claims, 1 Drawing Sheet

CERAMIC MATRIX COMPOSITE TURBINE COMPONENTS

CROSS-REFERENCE TO RELATED APPLICATIONS

This application is a division of application Ser. No. 09/595,866 filed Jun. 16, 2000, now U.S. Pat. No. 6,441,341.

BACKGROUND OF THE INVENTION

The present invention is generally directed to a method of forming cooling holes in ceramic matrix composite components, and specifically to a method of forming cooling holes in ceramic matrix composite components for use at elevated temperatures in which the matrix is a silicon carbide or a silicon nitride.

Improvements in manufacturing technology and materials are the keys to increased performance and reduced costs for many articles. As an example, continuing and often interrelated improvements in processes and materials have resulted in major increases in the performance of aircraft gas turbine engines. These improvements frequently have been in the areas of weight reduction and/or improving the temperature capabilities of the engine and its respective components, which improve engine efficiency.

An aircraft gas turbine engine or jet engine draws in and compresses air with an axial flow compressor, mixes the compressed air with fuel, burns the mixture, and expels the combustion product through an axial flow turbine that powers the compressor. The compressor includes a disk with blades projecting from its periphery. The disk turns rapidly on a shaft, and the curved blades draw in and compress air in somewhat the same manner as an electric fan. In addition to supporting combustion, the compressed air is then used to cool the engine components in the combustor and portions of the engine aft of the combustor. Additional air from the compressor is used in conjunction with auxiliary systems of the engine and plane.

Although lighter in weight than the superalloy materials typically utilized in the hot sections of gas turbine engines, ceramic matrix composites that include materials such as silicon carbide (SiC) and silicon nitride (SiN) have not been used in hot oxidizing atmospheres such as the combustor or turbine portion of gas turbine engines for various components because of problems with oxidation of SiC and SiN.

These materials have a tendency to oxidize, the SiC and SiN being converted into silica ($SiO_2$), Co and $CO_2$ or $NO_2$ respectively at elevated temperatures. Furthermore, unlike metals, there has been no effective method developed for providing cooling holes to utilize cooling air to cool the component such as is done with metal components. One of the problems is that conventionally applied cooling holes provide additional surface area for the oxidation of the SiC and SiN, when used as a matrix material or when used as the fiber reinforcement. Because the holes are so small, being between about 0.010–0.030 inches, there is no effective way of applying a protective coating over the newly exposed surface area, as the methods of applying the known protective coatings could close the cooling holes, rendering them ineffective and defeating their purpose.

While various methods are available for drilling holes in turbine components used in hot portions of turbine components, these methods are primarily directed at drilling holes in metal components. Two of these methods, U.S. Pat. Nos. 4,762,464 and 4,808,785 to Vertz et al. are directed to a two step method of forming cooling holes in airfoils utilizing a combination of laser drilling and EDM. EDM is a well-know process utilizing a spark discharge in which the work tool and the workpiece are charged electrodes and the spark is a transient electric discharge through the space between the electrodes.

U.S. Pat. No. 4,873,414 to Ma et al., solves the problem of detecting when a laser breaks through a surface such as a hollow metal airfoil component by filling the hollow portion of the airfoil with a light-emitting material. U.S. Pat. No. 5,140,127 to Stroud et al. solves the problem by injecting copolymers into the cavity so that the back wall of the hollow metal airfoil is unaffected by the laser beam, which vaporizes the copolymer. U.S. Pat. No. 5,222,617 solves the same problem by laser drilling the cooling holes in the investment cast metal airfoil before removing the ceramic core utilized in the investment casting process.

U.S. Pat. No. 5,465,780 to Muntner et al. discusses a method of manufacturing complex hollow blades by using laser machining for forming an intricate ceramic core. After casting the blade by pouring alloy around the core, the core is removed by conventional leaching methods.

U.S. Pat. No. 5,683,600 to Kelley et al. sets forth a method of drilling compound cooling holes with a non-circular surface opening in a gas turbine engine with a laser beam in metal alloys such as steels, titanium alloys, inconels and other nickel based superalloys. The method overcomes the conductive and reflective nature of these superalloys which causes a waveguiding effect to occur on the laser beam. The method controls the focal spot below or to undershoot the surface a preselected distance D to overcome the problems with the prior art processes and allows for the formation of the complex hole without the need to resort to the additional steps of EDM. U.S. Pat. No. 5,837,964 to Emer et al. sets forth a process for laser drilling large and deep holes in superalloy components by utilizing a combination of laser drilling a small central hole followed by trepanning laser drilling the hole to final size.

However, all of the prior art processes are directed to the problems with drilling laser holes for cooling, in metallic, typically superalloy, components. None of the prior art processes describes the problems associated with drilling small cooling holes in oxidizable, non-metallic components for use in the hot section of gas turbine engines, such as SiC or SiN-containing ceramic matrix composites (CMCs). Thus, none of the prior art processes sets forth solutions to these problems which include drilling holes to an adequate size to permit cooling air to flow through the non-metallic components without oxidizing the oxidizible component and without cracking the relatively brittle ceramic material, while also providing a protective coating over the newly created surface area of the hole, so that the air flowing through the holes does not oxidize the oxidizable component of the CMC.

SUMMARY OF THE INVENTION

A method for producing apertures in turbine airfoil components and combustor liners utilizes laser drilling of ceramic matrix composites that have at least one oxidizable component. Air-cooled CMCs have not been used commercially in the hot section of gas turbine engines, that is, the portion of the engine that includes the combustor, as these materials exhibit deficiencies, despite the weight advantage that these materials have over the typical metallic superalloy components. As these deficiencies are overcome, the prospects of these materials being used increase. One of these deficiencies has been an inability to drill small holes in CMCs having an oxidizable component while providing suitable protection to the newly formed surface of the cooling holes so that the oxidizable component will not decompose, contributing to part failure, as cooling air is circulated through them.

Examples of turbine components that can be made from CMCs utilzing the parameters of the present invention include turbine blades, turbine vanes, turbine buckets, nozzles, and the like. Some combustor components such as combustor liners can also be manufactured. The parameters developed for laser drilling of the holes produces holes of predetermined size, geometry and hole pattern to promote effective cooling. As the laser is applied to the ceramic matrix composite material, a portion of the material is vaporized or ablated to form the aperture or hole. However, some of the energy of the laser beam also melts material adjacent to the beam. This melted material is oxidized and briefly flows along the newly formed aperture surface. This material quickly forms a recast layer along the aperture surface as it cools which forms an oxidation barrier for the oxidizable ceramic matrix material under it. This oxidation barrier prevents or at least significantly reduces the oxidation of the underlying CMC, thereby reducing or eliminating its deterioration. Significantly, the parameters produce a cooling hole surfaces that are sealed by the drilling process to prevent deterioration of the oxidizable component of the ceramic matrix composite material.

The present invention permits the use of ceramic matrix composite materials having an oxidizable component as engineering materials for components in hot sections of turbine engines that require cooling holes for circulation of cooling air, without requiring additional steps to seal the cooling hole surfaces.

The parameters used to create the laser drilled holes forms a sealed surface over the cooling hole surface. This surface creates a barrier that prevents, or at least reduces the oxidation of the oxidizable component of the bulk CMC material so that it maintains its as-fabricated fracture toughness characteristics even after exposure to the hot, oxidizable environment of a gas turbine engine.

Another advantage of the present invention is that the laser process of the present invention seals the surfaces of the holes without the need for applying an additional environmental coating to the cooling hole surfaces. Although environmental coatings still may need to be applied to protect other sections of the CMC component that operate at higher temperatures, there is no longer a dependence to rely upon these coating deposition methods to protect the hole surfaces, thereby reducing the possibilities of blocking holes or seriously reducing the diameter of cooling holes that can cause local hot spots in the component which can degrade the component while attempting to coat the surfaces of cooling holes.

Additional advantages include cost effectiveness, as the laser process uses relatively short processing times to produce each hole. The laser process can also produce a variety of hole sizes and diameters, and these capabilities can be readily practiced in a production mode.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Whenever possible, the same reference numbers will be used throughout the figures to refer to the same parts.

DETAILED DESCRIPTION OF THE INVENTION

Figure 1:
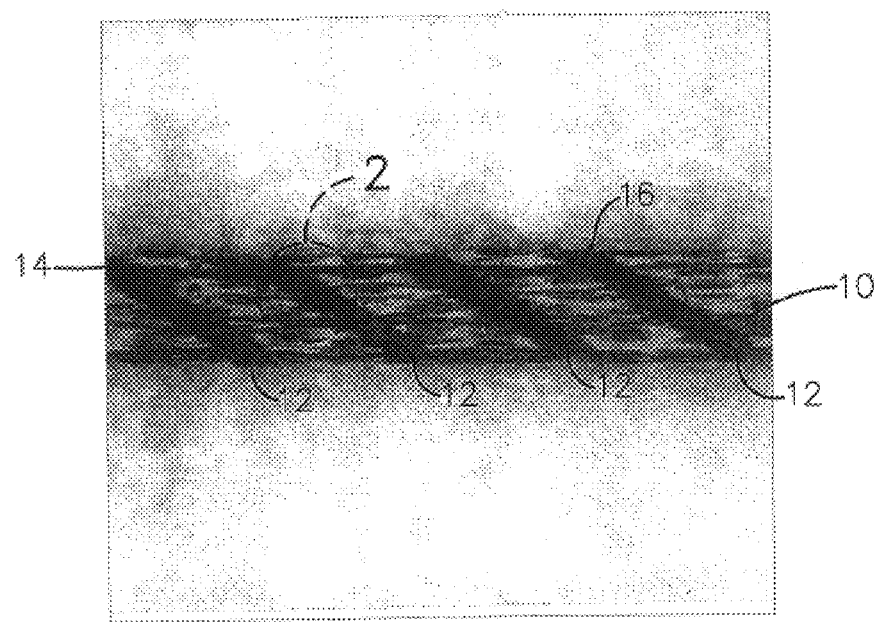
FIG. 1 is an optical micrograph of an aperture drilled in a SiC/SiC composite formed in accordance with the present invention.

The present invention is used to improve the performance of gas turbine engines by facilitating the use of light weight composite materials. Due to increasing emphasis on increased thrust-to-weight ratios, higher combustion efficiencies, low emissions, and improved specific fuel consumption (SFC), engine combustors and the gases that they produce are tasked to operate at increasingly higher temperatures. These temperatures require better high temperature materials, and/or more cooling air. The materials currently used in these applications are superalloy materials. However, CMCs provide a significant weight advantage over the superalloys and have desirable engineering properties if certain deficiencies are overcome.

The use of ceramic matrix composites having at least one oxidizable component as engineering materials in production gas turbine engines has been limited because the technology to cool CMCs at high temperatures of operation and in oxidizing environments has not been adequately developed. Ceramic matrix composites most frequently considered for hot section applications have included at least one component that includes a silicon-based material. These silicon-based materials typically are silicon carbide (SiC) and silicon nitride (SiN). As used herein, the hot section of a gas turbine includes the combustor portion and the sections aft of the combustor portion including but not limited to the first and second stage turbines.

SiC and SiN may be used as matrix materials in CMCs, with fibers of various types providing reinforcements. These reinforcing fibers can include metallic fibers, organic fibers, glass fibers and ceramic fibers and can be present as rovings or as unidirectional reinforcement, depending upon the strength requirements and isotropy required for the application. The composites are referred to as metal fiber reinforced ceramic composites, organic fiber reinforced ceramic composites, glass fiber reinforced ceramic composites and ceramic/ceramic composites respectively, all generically referred to as ceramic matrix composites. In fact, SiC fibers and SiN fibers can be used in conjunction with SiC and SiN matrix materials. However, because the materials of the fiber and matrix are silicon-based, in order to maintain their individual properties within the matrix and prevent their incorporation, the fibers are coated, most typically with a thin boron nitride (BN) coating.

One of the limitations on the use of SiC and SiN in turbine engine hot section components has been the potential for oxidation of SiC and SiN, whether used as fibers or as matrix material into gases and silica at the elevated temperatures of operation as previously noted. In addition, the BN coating typically applied to fibers also has a tendency to break down by oxidation at the elevated temperatures at a rate that is faster than the oxidation of SiC and SiN. This rate of coating attack is even greater in flowing gases containing gaseous $H_2O$, water vapor, as is frequently found in the exhaust of gas turbine engines. These combined changes can result in a significant change in the mechanical properties of the CMC materials. However, recent advancements in coatings when properly applied to these CMC materials have reduced their degradation by oxidation at elevated temperatures. Notably, the fracture toughness is adversely affected by oxidation.

The degradation of BN by attack is a particular problem in the temperature range of about 1200–1500° F., as SiC does not convert to silica and gas at a rate fast enough to prevent volatilization by the formation of $B_2O_3$ and $NO_x$, where N=1, 2, 3 Because the surface is not self-sealing, BN attack and degradation of the CMC will occur, and very rapidly, unless the cooling hole surfaces are protected. The present invention solves this problem.

In the preferred embodiment of the present invention, the ceramic matrix material is a silicon-based material, most preferrably SiC or SiN. The fiber reinforcement can be a metallic fiber or a ceramic fiber. Most organic fibers and glass fibers do not have capabilities to withstand the high temperatures of a hot section of a gas turbine, even with today's advanced coatings. While any ceramic fiber such as alumina, also referred to as sapphire, nicalon or metallic fiber such as a superalloy having a melting temperature above about 2200° F. capable of withstanding the high temperatures of the hot section of a gas turbine may be used, when a ceramic fiber such as SiC or SiN is selected, it is typically coated with a coating such as BN. However, other fiber coatings available as substitutes for BN, such as carbon and carbon containing coatings will be susceptible to attack in the oxidizing, hot gas turbine atmosphere.

The CMC material is formed into plies of material having thicknesses of 0.001–0.018 inches, and most typically 0.005–0.015 inches. The thicknesses of the plies are usually dictated by the size of the of the fiber tows (filament bundles) selected for use, and the thicknesses of the plies may vary with fiber diameter. For most of the applications considered herein, the plies are formed as two-dimensional woven fabric, although one-dimensional fiber orientation may also be used. However, the method of manufacturing the plies, laying up the plies to form the component part and other parts manufacturing technology used in the composite industry are not meant to limit the present invention. At this time, the method of forming the component from plies is part of the best mode of practicing the present invention. The plies are laid up to form the shape of the article being formed, the angles of the adjacent plies may vary depending on the planar strength required. The components that can be made using these CMC materials include but are not limited to turbine blades, turbine vanes, turbine shrouds, and combustor liners, casings, heat shields and diffusers. These hot section components all benefit from the use of cooling air to provide sufficient cooling to accomplish heat transfer during engine operation, thereby extending their range of use. However, the invention is not limited to cooling holes such as dilution cooling holes, impingement cooling holes and film cooling holes, and may be used for non-cooling excavations such as bolt holes or windows.

To overcome one of the traditional problems associated with drilling apertures in ceramic matrix components, which is the exposure of the oxidizable component of the CMC, be it the fiber, the fiber coating or the matrix, as new surface areas are created in the matrix by the apertures, the present invention utilizes a laser drilling technique. In the preferred embodiment, the laser drilling process of the present invention utilizes a Nd:YAG laser, although any other laser that is adaptable to produce the desired results may be used. The laser can produce cooling apertures having a predetermined diameter of from about 0.010 to about 0.030 inches. The apertures may be drilled normal to the surface of the component or at any angle from normal up to 70° from normal, that is to say, the apertures have a centerline vector that is up to 70° from normal to the part surface. Although holes having a circular cross section are preferred, various cross sections can be produced, and a plurality of cross sections can be formed in any single aperture or hole. The spot size of the laser is adjusted so that it is the diameter of the desired hole size. The surface to be drilled is positioned to be immediately below the focal point of the laser, which utilizes nozzle cooling air at pressures of from about 10–100 psi. In the preferred embodiment, the laser ablates CMC material immediately below its focal point, thereby creating the aperture. Simultaneously, the laser energy is sufficient to melt the SiC or SiN matrix material immediately adjacent to it. The progression of the drilling operation occurs so quickly that the melted material flows only a short distance before resolidifying along the newly created surface as recast material as the pressurized air from the laser nozzle assists in cooling it. The recast material is substantially silica that forms an oxidation barrier along the surface of the newly created aperture so that deterioration of the CMC material along this surface will not occur as cooling air is introduced into the passage. It will be recognized by those skilled in the art that "cooling air" introduced into a component to maintain its temperature below the temperature of the surrounding atmosphere, can have a high temperature in excess of 1700° F.

Referring now to FIG. 1, which is an optical micrograph of an aperture 12 drilled by the process of the present invention in a Melt Infiltration SiC/SiC composite 10 having a thickness of about 0.100 inches (0.25 cm), aperture 12 has a circular cross section with a diameter of about 0.020 inches which is relatively uniform through the material thickness. There is present along the surface or wall 14 of the aperture 12 created by the laser drilling a thin recast layer 16 of silica.

Figure 2:
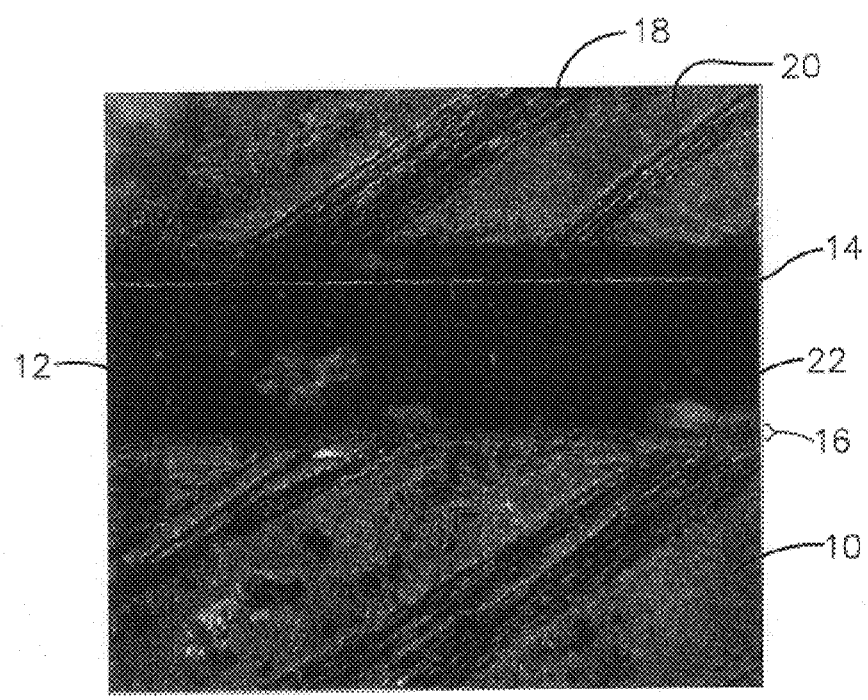
FIG. 2 is a 50× magnification of the region depicted in FIG. 1.

FIG. 2 is a 50× magnification optical micrograph of the region shown in FIG. 1. The thin, recast layer 16 along surface or wall 14 of aperture 12 is more evident in the magnified photomicrograph. The SiC fibers 18 in SiC matrix 20 is also more clearly seen. However, the thin coating of BN applied to SiC fibers is not readily evident at this magnification. Small segments of fiber 22 project a small distance away from wall 14; however, these fiber segments 22 are also coated with silica.

Although the exact formation of the recast layer 16 along wall 14 is not clearly understood, and not wishing to be bound by the theory, the following is believed to be the method of formation of the silica. The beam is adjusted so that it has sufficient power and fluence to ablate material below its focal spot. The power and fluence can be adjusted to accommodate different hole sizes and different materials. For SiC/SiC composites, the Nd:YAG laser can be adjusted between about 100–250 watts with pulse rates of between about 0.0005 seconds to 0.010 seconds to achieve fluences of about $1.0 \times E+04$ joules per square inch to about $1.0 \times E+05$ joules per square inch to form apertures of about 0.010–0.030 inches. The laser beam must have sufficient energy to also melt the adjacent matrix material, SiC or SiN. If the adjacent SiC or SiN is not melted or is only partially melted, the matrix material will not have an opportunity to flow. As the laser beam and the cooling air contact the composite material and heats it, the bonds of the SiC or SiN are broken causing the formation of silica and gases, either CO, $CO_2$ or $NO_2$, which mix with the air. The vaporization point of the silica, in excess of about 4046° F., is reached and the silica is ablated, creating hole 12. Immediately adjacent the laser beam at wall 14, the composite matrix material 20, SiC or SiN is heated in the oxidizing atmosphere to a point at which the matrix material begins to decompose into its constituent components as set forth above, and the silica begins to melt and flow as the local temperature in region 16 exceeds about 3133° F. The fiber material also begins to at least partially melt as well. The cooling air from the laser nozzle also serves to quickly cool wall 14 as the drilling of hole 12 progresses, so that the silica does not have an opportunity to flow any significant distance. The silica thus forms recast layer 16 in the presence of the cooling air that serves as an oxidation barrier along wall 14. This process occurs very quickly, and fiber segments 22 that are not fully melted or ablated are coated with a layer of silica to provide oxide protection and prevent deterioration of fiber during engine operation. As the coated SiC fibers do not fully melt in the vicinity of wall 14, it is believed that the maximum temperature in the region of the wall is no greater than about 4892° F., the melting point of SiC.

Clearly, the parameters of the present invention must be adjusted to accommodate different hole sizes and different materials to accomplish these results. If the laser imparts insufficient energy, materials along the wall may not fully melt and flow to form the recast protective layer. If the laser imparts too much energy, or if an insufficient amount of cooling air is provided, the flow of the melted materials will not be excessive and the walls will not be smooth, which is undesirable. If the pressure of cooling air is too great, the materials along the wall may not melt, or if melted, may be carried away by the pressurized air, so that protective silica is not formed. If a cooling gas is provided that does not include oxygen, the oxidation that converts the silicon-based materials, SiC or SiN, may not occur so that conversion of SiN or SiC to silica may not occur. It is not clear that the holes could be drilled using the parameters set forth, as higher energy input may be required to ablate SiC and SiN if oxygen is not present.

EXAMPLE

A combustor liner was made from a SiC/SiC was drilled using the laser process of the present invention. The SiC fibers were coated with boron nitride (BN) coatings to facilitate their incorporation into the SiC matrix. A Nd:YAG laser was utilized. The laser used was an Omega Laser available from Coherent General Inc. now doing business as Convergent Energy of Sturbridge, Mass., although any other Nd:YAG laser capable of producing the following parameters may be used. The laser produced about 150 watts of power at a pulse rate of about 6 Hz with a pulse width of about 0.001 seconds. The average energy per pulse was about 25 joules and the peak power was about 25,000 watts. The spot size was about 0.02 inches with a lens diameter of 1.5" and a focal length of about 8°. The fluence was 7.96E+04 joules per square inch. The apertures were drilled at an angle of 70° from an angle formed normal to the component surface. The percussion drilling method was used. The drilling was done under a normal atmosphere and cooling air was introduced at about 60–80 psi. The beam quality was about 20 millimeters-milliradians and the beam divergence was about 27 milliradians. The apertures formed had a cross section that was substantially circular, and the surface of the formed holes was coated with recast silica that formed an oxide barrier for the SiC/SiC composite underlying it. Under magnification, small microfibers of SiC fibers protruded slightly away from the wall surface, but these fibers were also coated with silica.

The combustor liner made in accordance with this example successfully retained its fracture toughness characteristics after being exposed in a burner rig test to temperatures of about 2200° F. for greater than 50 hours.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A turbine component for use in a hot section of a gas turbine engine, comprising:
    a ceramic matrix composite material, comprising at least one oxidizable component;
    a thermal barrier coating applied over the ceramic matrix composite material,
    an oxidation barrier between the thermal barrier coating and the ceramic matrix composite; and
    a plurality of cooling holes extending through the component, the surface of each cooling hold having a recast layer formed by a laser drilling operating, the recast layer forming an oxidation barrier for the underlying ceramic matrix composite.

2. A turbine component for use in a hot section of a gas turbine engine comprising:
    a ceramic matrix composite material further comprising reinforcing fibers in a ceramic matrix, in which the ceramic matrix material in a silicon based material and the reinforcing fibers are selected from the group consisting of ceramic fibers, glass fibers, organic fibers, metallic fibers, and combinations thereof; and
    at least one aperture formed in the ceramic matrix composite, the at least one aperture having walls formed in the ceramic matrix composite, the walls of the at least one aperture being a substantially smooth, continuous, recast layer of silica that forms an oxidation barrier to protect the underlying CMC material from high temperature oxidation, the at least one aperture being formed by laser drilling and the recast layer being formed as laser energy melts the material adjacent to the at least one aperture and pressurized from the laser nozzle resolidifies the melted CMC as recast silica.

3. A turbine component for use in a hot section of a gas turbine engine comprising:
    a ceramic matrix composite material further comprising reinforcing fibers in a ceramic matrix, in which the ceramic matrix material is a silicon based material and the reinforcing fibers are selected from a group consisting of ceramic fibers, metallic fibers, and combinations thereof; and
    at least one aperture formed in the ceramic matrix composite, the at least one aperture having a preselected cross-sectional area having a wall formed in the ceramic matrix composite, the at least one aperture having a centerline vector that is up to 70° from normal to the turbine component surface, the wall of the at least one aperture being substantially smooth, continuous, recast layer of silica that forms an oxidation barrier to protect the underlying CMC material from high temperature oxidation, the at least one aperture being formed by laser drilling and the recast layer being formed as laser energy melts the material adjacent to the aperture and pressurized air from the laser nozzle resolidifies the melted CMC as recast silica.

4. The turbine component of claim 2 wherein the ceramic fibers are selected from the group consisting of sapphire, nicalon, SiC and SiN.

5. The turbine component of claim 2 wherein the at least one aperture has a preselected cross-sectional area.

6. The turbine component of claim 2 wherein the at least one aperture has a circular cross-sectional area and a diameter in the range of from about 0.010–0.030 inches.

7. The turbine component of claim 2 wherein the metallic fibers include superalloy fibers with a melting temperature above 2200° F.

8. The turbine component of claim 2 wherein the turbine component is a turbine blade.

9. The turbine component of claim 2 wherein the turbine component is a turbine vane.

10. The turbine component of claim 2 wherein the turbine component is a turbine shroud.

11. The turbine component of claim 2 wherein the turbine component is a combustor liner.

12. The turbine component of claim 2 wherein the turbine component is a turbine casing.

13. The turbine component of claim 2 wherein the turbine component is a heat shield.

14. The turbine component of claim 2 wherein the turbine component is a diffuser.

15. The turbine component of claim 2 wherein the ceramic fibers are coated with BN.

16. The turbine component of claim 2 wherein the at least one aperture has a preselected cross-sectional area.

17. The turbine component of claim 6 wherein the at least one aperture has a circular cross-sectional area and a diameter in the range of from about 0.010–0.030 inches.

18. The turbine component of claim 3 wherein the fibers are rovings.

19. The turbine component of claim 3 wherein the fibers are unidirectionally oriented.

20. The turbine component of claim 2 wherein the silicon-based matrix material is selected from the group consisting of SiC and SiN.

* * * * *